Patented Sept. 2, 1924.

1,506,936

UNITED STATES PATENT OFFICE.

JAMES EDWARD LEA, OF MANCHESTER, ENGLAND.

APPARATUS FOR INDICATING AND RECORDING THE RATE OF FEED OF GRANULAR MATERIALS.

Application filed September 25, 1922. Serial No. 590,283.

*To all whom it may concern:*

Be it known that I, JAMES EDWARD LEA, a subject of the King of Great Britain and Ireland, residing at Manchester, England, have invented new and useful Improvements in or Relating to Apparatus for Indicating and Recording the Rate of Feed of Granular Materials, of which the following is a specification.

This invention refers to apparatus for electrically indicating the rate of feed of granular material delivered through an orifice by an endless travelling conveyor or reciprocating conveyor, and the invention has for its object an arrangement of electric generator and voltmeter, ammeter or the like for indicating the rate of feed in terms of weight or density, instead of volume, as in my prior application for patent, Serial No. 565200, filed 1st June, 1922, where the density or weight per unit volume of material changes from time to time as in the case say of different qualities of coal, in fuel feeding apparatus.

According to the invention, the voltmeter is calibrated to indicate lbs., kilos or the like, and in the circuit of the voltmeter is arranged a variable resistance by which the voltage (or the amperage) of the circuit flowing through the circuit of the voltmeter may be varied.

With the density or weight per cubic foot of the granular material known, and the cubic feet of material delivered by the conveyor per minute also known, the said variable resistance in the circuit of the voltmeter is regulated until the pointer of the voltmeter points to the corresponding weight per cubic foot or density of material, after which, with the same material, the readings correctly indicate the rate of feed in lbs. or kilos, etc., at any moment.

Upon the accompanying drawings.

Figure 1:
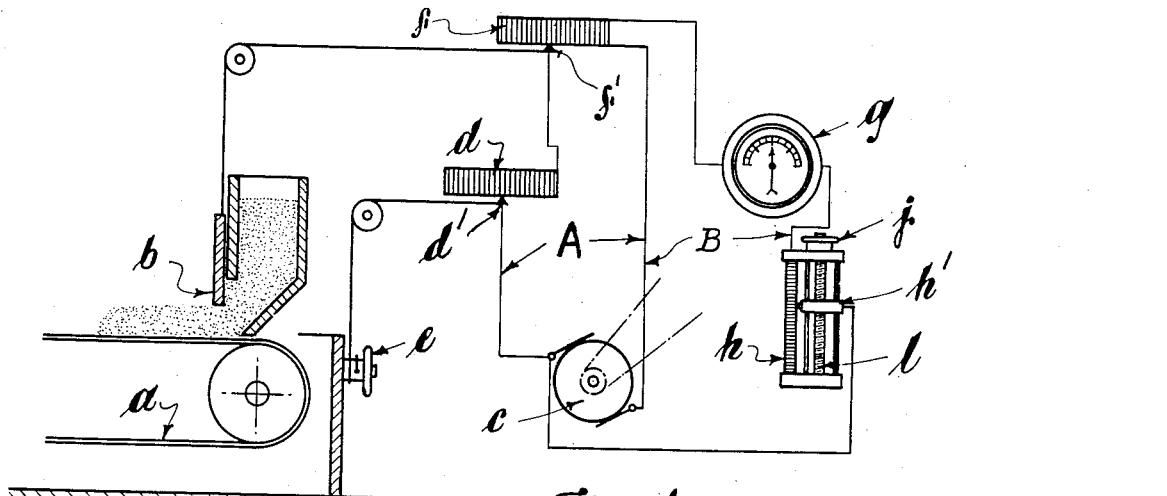
Figs. 1 and 2 are diagrammatic views of a portion of an endless belt conveyor showing two alternative forms of the improved indicator.

In Figure 1 the invention is shown applied to an endless conveyor $a$ delivering material through an orifice under the control of a vertically movable door or regulator $b$, the speed of the conveyor being variable, and the height of the regulator being variable. A dynamo or generator $c$ is employed, driven at a constant speed from any convenient source of power. A variable resistance $d$ is provided in the circuit A of the dynamo, the movable contact $d^1$ of such resistance being connected to the hand wheel $e$ controlling the change speed gear of the conveyor. A further resistance $f$ is also provided in this circuit the movable contact $f^1$ of which is connected with the said movable door or regulator $b$.

In a second circuit B connected with the first or dynamo circuit is a voltmeter $g$ calibrated to indicated weight, and also in such circuit is a further regulatable resistance $h$, hereinafter called the density regulator or corrector.

With the dynamo $c$ driven at constant speed, the current output will vary with any increase or decrease of the variable resistances $d$ and $f$. Further, with the increments of the resistance $d$ proportional to the speed of the conveyor $a$, and with the increments of the resistance $f$ proportional to the increase in the height of the door $b$, the current flowing through the circuit A and B and consequently the reading of the voltmeter $g$ will be proportional to the volume of material being delivered through the orifice. Should, however, the density and relative weight per unit volume of the material passing through the orifice vary, the reading of the voltmeter, whilst being proportional to the volume, will not be proportional to the weight of the material being delivered by the conveyor. The reading of the voltmeter is adjusted by means of the further variable resistance $h$, the movable contact $h^1$ of which is set by hand until the reading coincides with a known weight of the material delivered. After setting, the voltmeter will correctly indicate the weight of the material passing through the orifice at any moment.

Figure 2:
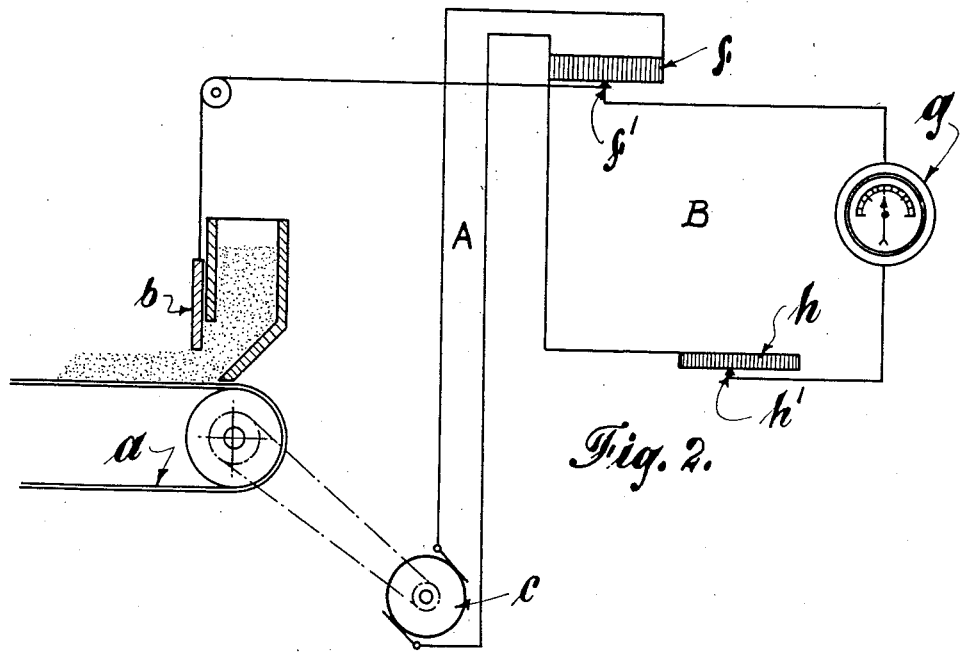

As shown in Figure 2, the generator $c$ is driven by the conveyor $a$ and the current output is therefore directly proportional to the speed of the dynamo, and, as the cubic feet of material delivered by the conveyor is directly proportional to the speed of the conveyor and the thickness of the layer of material on the conveyor, the voltmeter, for a given density of material, will indicate the rate of feed at any moment. Should, however, the density or weight per unit volume of material vary, then the voltmeter will require adjustment and this is done by the density regulator or variable resistance in the voltmeter circuit, as before described.

In the case of materials delivered through an orifice of fixed size by a reciprocating conveyor, the speed of which may vary, a single circuit is used, and only one variable resistance, i. e., the density regulator or corrector. In this case the dynamo is driven by the conveyor.

Figure 3:
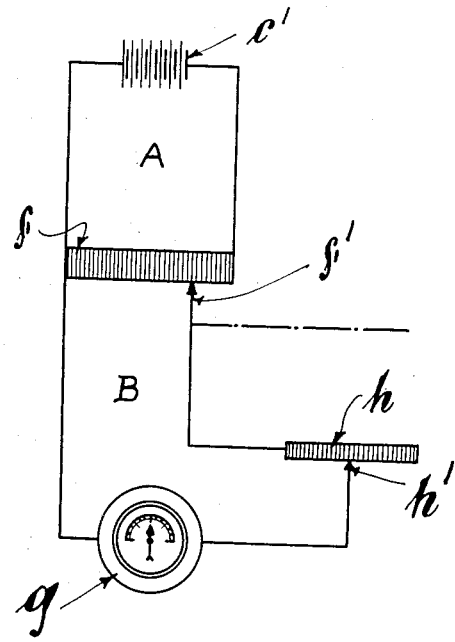
Figs. 3 and 4 are diagrammatic views of modified arrangements of the improved indicator.

In measuring the rate of flow of materials controlled by one variable only, one resistance is employed as shown in Figure 3, the movable contact of which is controlled by the member controlling the rate of flow of material. Instead of a dynamo generator, an accumulator battery $c^1$ may be employed.

Figure 4:
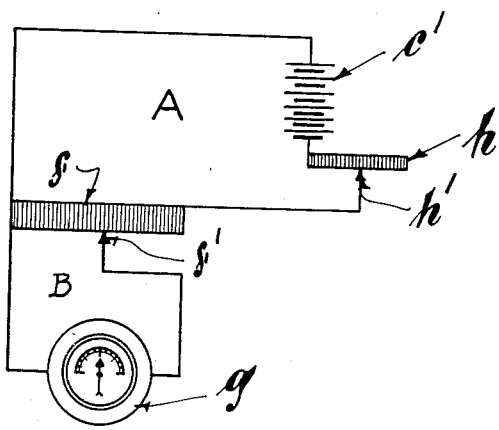

If desired, the density regulator or corrector may be placed in the generator A as shown in Figure 4, instead of in the voltmeter circuit B.

The invention is more particularly applicable to mechanical stokers, of the endless grate type, or the underfeed (reciprocating ram) type, or the shovel type, but it is also applicable to apparatus for feeding grain, and other granular materials.

In addition to the voltmeter for indicating the rate of feed in lbs. or kilos, etc., at any moment, there may be a further electrical instrument for graphically recording the rate of feed, such instrument being in series with the voltmeter.

What I claim is:—

1. Means for indicating electrically (in terms of weight) the rate of feed of granular material delivered by a conveyor through an orifice, comprising an electric circuit, a generator in said circuit, means in said circuit for varying the current flowing through the circuit proportionately to variations in the rate of flow of material passing through the orifice, and further means in said circuit to vary the current proportionately to the density of the material delivered and a voltmeter in said circuit calibrated in terms of weight, as set forth.

2. Means for indicating electrically (in terms of weight) the rate of feed of granular material delivered by a conveyor through an orifice controlled by a regulator comprising an electric circuit, a dynamo in said circuit, a variable resistance in said circuit influenced by the speed of the conveyor a further variable resistance in said circuit influenced by the orifice regulator, a third and hand-operated variable resistance in said circuit and a voltmeter calibrated in terms of weight, as set forth.

In testimony whereof I have signed my name to this specification.

JAMES EDWARD LEA.